H. HEDDEN.
NUT AND BOLT LOCK.
APPLICATION FILED SEPT. 22, 1910.

1,026,035.

Patented May 14, 1912.

2 SHEETS—SHEET 1.

Witnesses

Inventor
Harry Hedden
by H. B. Willson & Co.
Attorneys

COLUMBIA PLANOGRAPH CO., WASHINGTON, D. C.

H. HEDDEN.
NUT AND BOLT LOCK.
APPLICATION FILED SEPT. 22, 1910.
1,026,035.
Patented May 14, 1912.
2 SHEETS—SHEET 2.
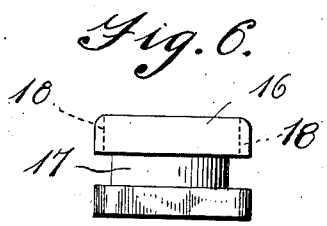
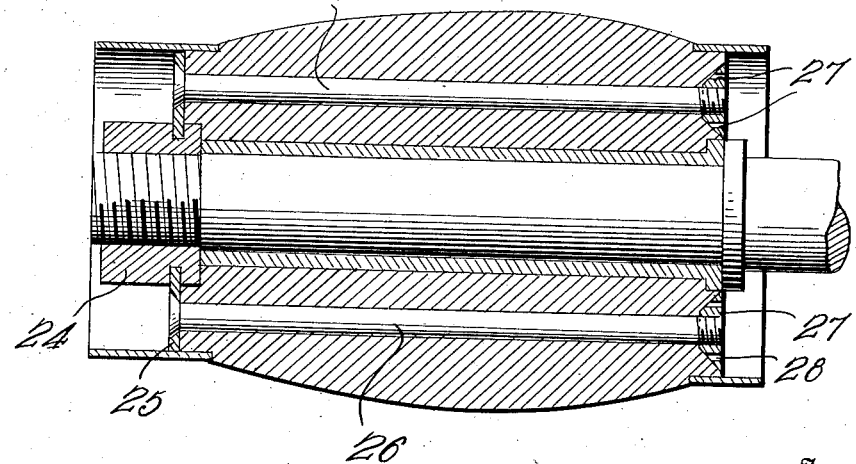
Witnesses
C. R. Hardy
O. B. Hopkins
Inventor
Harry Hedden
by H. B. Willson & Co.
Attorneys

UNITED STATES PATENT OFFICE.

HARRY HEDDEN, OF EVANSVILLE, INDIANA.

NUT AND BOLT LOCK.

1,026,035.   Specification of Letters Patent.   Patented May 14, 1912.

Application filed September 22, 1910. Serial No. 583,273.

*To all whom it may concern:*

Be it known that I, HARRY HEDDEN, a citizen of the United States, residing at Evansville, in the county of Vanderburg and State of Indiana, have invented certain new and useful Improvements in Nut and Bolt Locks; and I do declare the following to be a full, clear, and exact description of the invention, such as will enable others skilled in the art to which it appertains to make and use the same.

This invention relates to improvements in nut and bolt locks and has for its object the provision of means whereby the nut or bolt or both may be firmly secured to the structure to which they are applied and held against accidental separation from such structure or from each other.

With the above and other objects in view, the invention consists of certain novel features of construction, combination and arrangement of parts as will be more fully described and particularly pointed out in the appended claim.

Figure 1:
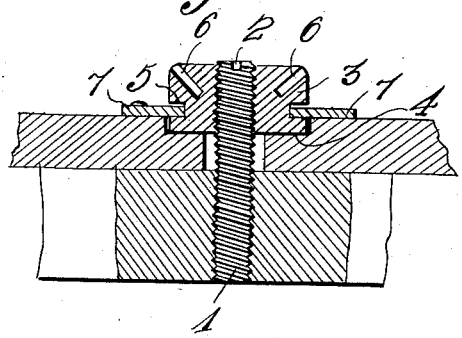
Figure 4:
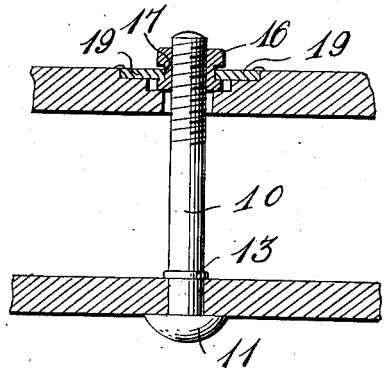
Figure 2:
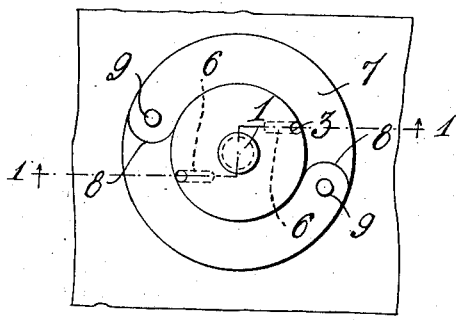
Figure 5:
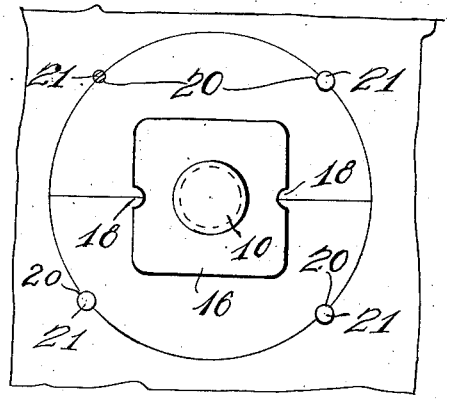
Figure 3:
Figure 7:

In the accompanying drawings: Figure 1 is a vertical sectional view through a portion of a box and its cover showing one application of my improved bolt and nut; Fig. 2 is a top plan view of the bolt and nut as shown in Fig. 1; Fig. 3 is an edge view of the nut locking washer shown in Figs. 1, and 2; Fig. 4 is a view similar to Fig. 1 showing another form of bolt and nut and means whereby both the bolt and nut are fastened; Fig. 5 is a plan view of the same; Fig. 6 is a side view of the nut shown in Figs. 4 and 5; Fig. 7 is a plan view of the bolt fastening ring shown in Figs. 4 and 5; Fig. 8 is a longitudinal section of a wheel hub and axle showing an application of the invention for holding the hub retaining cap on the axle.

Referring more particularly to Figs. 1, 2 and 3 of the drawings, 1 denotes the bolt which in these figures is shown as a screw bolt having in its outer end a notch 2 adapted to receive a screw driver whereby said bolt may be driven into the object to which it is to be applied.

In the present instance the bolt 1 is shown as being applied to the upper edge of one side of a box for the purpose of fastening the cover thereon and when thus applied the upper end of the bolt is adapted to project through a suitable opening in the cover and to extend above the cover as shown.

Adapted to be screwed into engagement with the projecting upper end of the bolt is my improved nut 3, the inner side of which is preferably set into a recess 4 formed in the upper side of the cover as shown. The nut 3 in the present instance is shown as being circular in form and in the outer edge thereof adjacent to its lower side is formed an annular groove or channel 5. The recess 4 in the cover of the box is of such depth that when the nut is seated therein the lower wall of the groove or channel 5 will be flush or on a line with the upper surface of the cover as shown. In the top of the nut and preferably on opposite sides of the same are formed sockets or recesses 6 which are adapted to receive a nail or other suitable implement whereby the nut may be readily turned on the bolt.

Secured to the upper side of the top or cover of the box is a nut retaining washer 7 formed in two semicircular sections, said sections having their meeting ends notched or mortised as shown at 8 whereby when said mortised ends are brought together into overlapping engagement the upper and lower surfaces of the two sections will be flush with each other. In the overlapping ends of the washer are formed alined screw holes through which are inserted fastening screws 9 which are driven down into the top or cover of the box thereby holding the sections of the washer together, as well as fastening the same to the top or cover of the box. When thus applied to the top or cover the inner edges of the washer sections engage the annular groove or channel 5 formed in the nut and thereby hold the nut to the cover as will be readily understood on reference to Fig. 1.

In Figs. 4 and 5 of the drawing is shown a slightly modified form of bolt and nut and a slightly modified form of nut retaining washer. In this form of the device the bolt 10 is provided on one end with a head 11 which may be of any suitable shape. It is advisable that the bolt 10 be rigidly secured to the object through which it passes at its head end and I have shown a fastening means suitable for this purpose. In the bolt at a suitable distance from the head is formed an annular groove or channel 12, said channel being arranged to occupy a position close to the inner surface of the object to which the bolt is applied and engaged by a bolt fastening ring or section of a ring 13 which impinges against the inner surface of the object to which the bolt is applied and thereby prevents the casual disengagement or removal of the bolt from the object.

On the opposite end of the bolt 10 is screwed a nut 16 which may be of any suitable shape and which is here shown as being rectangular and as having formed therein an annular groove or channel 17 corresponding to the groove 5 formed in the nut 3 of the first form of the invention. The nut 16 is provided at diametrically opposite points with notches or recesses 18 which may be engaged by a suitable implement to turn and release the nut. In applying this form of the nut, the inner portion thereof is preferably set into a recess or opening formed in the object to which the same is applied and the groove 17 in the nut is engaged by the sections of a two-part washer 19 which are also arranged in a recess formed in the outer side of the object, whereby the washer will be countersunk therein as is clearly shown in Fig. 4. In the outer edge of the washer sections are formed notches 20 through which screws or similar fastening devices 21 are inserted into the structure to which the device is applied whereby the sections of the washer are held in engagement with the groove in the nut to retain the nut in place against accidental displacement. When it is necessary, however, to remove the nut, the fastening devices may be readily withdrawn by means of suitable tools and the nut and bolt thus disengaged.

In Fig. 10 of the drawings is shown a sectional view through a wheel hub arranged on the end of an axle spindle showing the application of my invention for fastening the cap or nut on the end of the axle. In this arrangement of the invention the nut 24 is seated in a recess formed in the end of the hub and is secured in place by a retaining washer 25 which may be constructed as shown in Figs. 1, 2 and 3 or as shown in Figs. 4 and 5. The sections of the washer 25 in this instance are held by the ends of the longitudinally disposed bolts 26 which extend entirely through the hub as shown. The bolts 26 are provided on their outer ends with beveled heads which fit into countersunk bolt holes formed in the sections of the washer and have applied to their opposite ends countersunk nuts 27 which are provided with oppositely disposed passages or grooves 28 to receive a suitable implement whereby the same are screwed on and off the bolts.

From the foregoing description taken in connection with the accompanying drawings, it will be seen that I have provided a very simple device by the use of which the accidental displacement of a nut or bolt and release and loss of the same will be prevented.

Various changes in the form, proportion and the minor details of construction may be resorted to without departing from the principle or sacrificing any of the advantages of the invention as defined in the appended claim.

Having thus described my invention, what I claim is:

A device of the character described, the combination with two members to be clamped, of a bolt secured to one of said members and projecting therefrom and adapted to pass freely through an opening in the other member, a nut adjustably mounted on said end of the bolt, said nut having an external annular groove, a nut retaining washer the inner edge of which freely engages with the groove formed in the nut, said washer being composed of two semi-circular sections having reduced overlapping ends, and fastening devices passed through said ends of the sections and into the last named member, whereby the nut is revolubly mounted upon the latter.

In testimony whereof I have hereunto set my hand in presence of two subscribing witnesses.

HARRY HEDDEN.

Witnesses:
H. E. MEYER,
J. H. DANNETTELL.